(12) United States Patent
Blutbacher

(10) Patent No.: US 6,746,250 B2
(45) Date of Patent: Jun. 8, 2004

(54) CONNECTION FOR A DISTRIBUTION NETWORK

(75) Inventor: Reinhold Blutbacher, Schlierbach (DE)

(73) Assignee: Ballard Power Systems AG, Kirchheim-Nabern (DE)

( * ) Notice: Subject to any disclaimer, the term of this patent is extended or adjusted under 35 U.S.C. 154(b) by 0 days.

(21) Appl. No.: 10/398,428

(22) PCT Filed: Sep. 26, 2001

(86) PCT No.: PCT/EP01/11113
§ 371 (c)(1),
(2), (4) Date: Oct. 14, 2003

(87) PCT Pub. No.: WO02/31929
PCT Pub. Date: Apr. 18, 2002

(65) Prior Publication Data
US 2004/0058586 A1 Mar. 25, 2004

(30) Foreign Application Priority Data
Oct. 5, 2000 (DE) .......................................... 100 49 196

(51) Int. Cl.[7] .............................................. H01R 33/00
(52) U.S. Cl. ......................... 439/34; 439/489; 307/10.1
(58) Field of Search .......................... 439/34, 489, 188, 439/299, 552; 307/10.1, 9.1, 10.5; 340/636, 638; 320/25, 48

(56) References Cited

U.S. PATENT DOCUMENTS

| 4,900,267 | A | * | 2/1990 | Nagasaka et al. ............ 439/489 |
| 5,336,934 | A | * | 8/1994 | Toepfer et al. ............. 307/10.1 |
| 5,435,748 | A | * | 7/1995 | Abe ........................... 439/489 |
| 5,758,414 | A |   | 6/1998 | Ehrenfels ..................... 29/857 |
| 5,818,673 | A | * | 10/1998 | Matsumaru et al. .......... 361/63 |
| 6,528,899 | B1 | * | 3/2003 | Saito et al. ................. 370/10.1 |

* cited by examiner

*Primary Examiner*—Alex Gilman
(74) *Attorney, Agent, or Firm*—Seed IP Law Group PLLC

(57) ABSTRACT

The invention relates to a mobile device comprising an apparatus for generating electric energy, which is connected to an energy distribution network containing branches to the electric loads. A switching and distribution unit connected to the energy generating system comprises a switch which is arranged upstream from the branches. The loads are connected to the switching and distribution unit by means of flexible conductors with connectors on their ends. Means are provided to ensure that the connectors can only be separated when there is no current.

13 Claims, 3 Drawing Sheets

CONNECTION FOR A DISTRIBUTION NETWORK

CROSS-REFERENCE TO RELATED APPLICATIONS

This application is a U.S. National Phase Application of International Application No. PCT/EP01/11113, filed Sep. 26, 2000, which claims priority to German Patent Application No. 100 49 196.0, filed Oct. 5, 2000, both of which are incorporated herein by reference in their entireties.

BACKGROUND OF THE INVENTION

1. Field of the Invention

The invention is generally directed to a mobile device comprising an apparatus to generate electrical energy, which is connected to an energy distribution network containing branches connected to electrical loads, with at least one of the loads being intended for the propulsion of the mobile device.

2. Description of the Prior Art

A mobile device, which comprises a fuel cell intended for the generation of electrical energy and which includes the distribution of energy to electrical loads that are arranged in a high-voltage network that is connected to the fuel cell, has been disclosed in German Patent Application No. 10006781.6. The mobile device, which in particular may be a motor vehicle, comprises further loads, which are arranged in a low-voltage network that contains at least one storage battery in addition to the loads and is connected to the high-voltage network via at least one dc-dc converter. Connected to the fuel cell is a central monitoring and control unit, which contains a contactor or power circuit-breaker for the fuel cell that is connected to the outputs or terminals of the fuel cell. Connected to the fuel cell power circuit-breaker are the lines of a high-voltage radial network, which contains the electrical loads. The radial branches of the network are equipped with fuses.

The central monitoring and control unit is equipped with means for measuring and monitoring the electrical variables of the networks and by opening the fuel cell power circuit-breaker disconnects the branches of the high-voltage network prior to the occurrence of operating states that are undesirable or hazardous for the network and its operation. In between the central monitoring and control unit and the electrical loads, the electrical interconnecting cables of the branches are executed as flexible conductors, e.g., cables. At their ends, the flexible conductors are equipped with plug-in connector elements that correspond to plug-in connector elements that are mounted on or in the housings of the monitoring and control unit or of the loads and these connected elements are connected in a detachable manner. The flexible conductors may, for example, be arranged in cable harnesses and during assembly are connected on or in the housings via their associated plug-in connector elements. The plug-in connector elements are disconnected for certain maintenance and repair work.

BRIEF SUMMARY OF THE INVENTION

In brief, this invention is directed to a mobile device comprising an apparatus to generate electrical energy, which is connected to an energy distribution network containing branches connected to electrical loads.

In one embodiment, a mobile device comprises an energy generating system, an electrical load and an energy distribution network, which comprises a branch coupling the energy generating system and the electrical load. The energy distribution network further comprises a switching means, a switching plug-in connector element coupled to the switching means, a load plug-in connector element coupled to the electrical load, and a flexible line comprising a first plug-in connector element, adapted to engage the switching plug-in connector element, and a second plug-in connector element, adapted to engage the load plug-in connector element. Each of the plug-in connector elements have a branch contact for forming an electrical connection between the energy generating system and the electrical load, and each of the first and second plug-in connector elements have a device with a contact means for opening and closing a line section of a control circuit of the energy distribution network. When the first and second plug-in connector elements are joined to, or separated from, the switching plug-in connector element and the load plug-in connector element, respectively, the contact means close later, or open earlier, than the branch contacts and when the contact means are closed, the switching means is closed, and when the contact means are open, the switching means is open.

These and other aspects of this invention will be apparent upon reference to the attached figures and following detailed description.

DETAILED DESCRIPTION OF THE INVENTION

Figure 1:
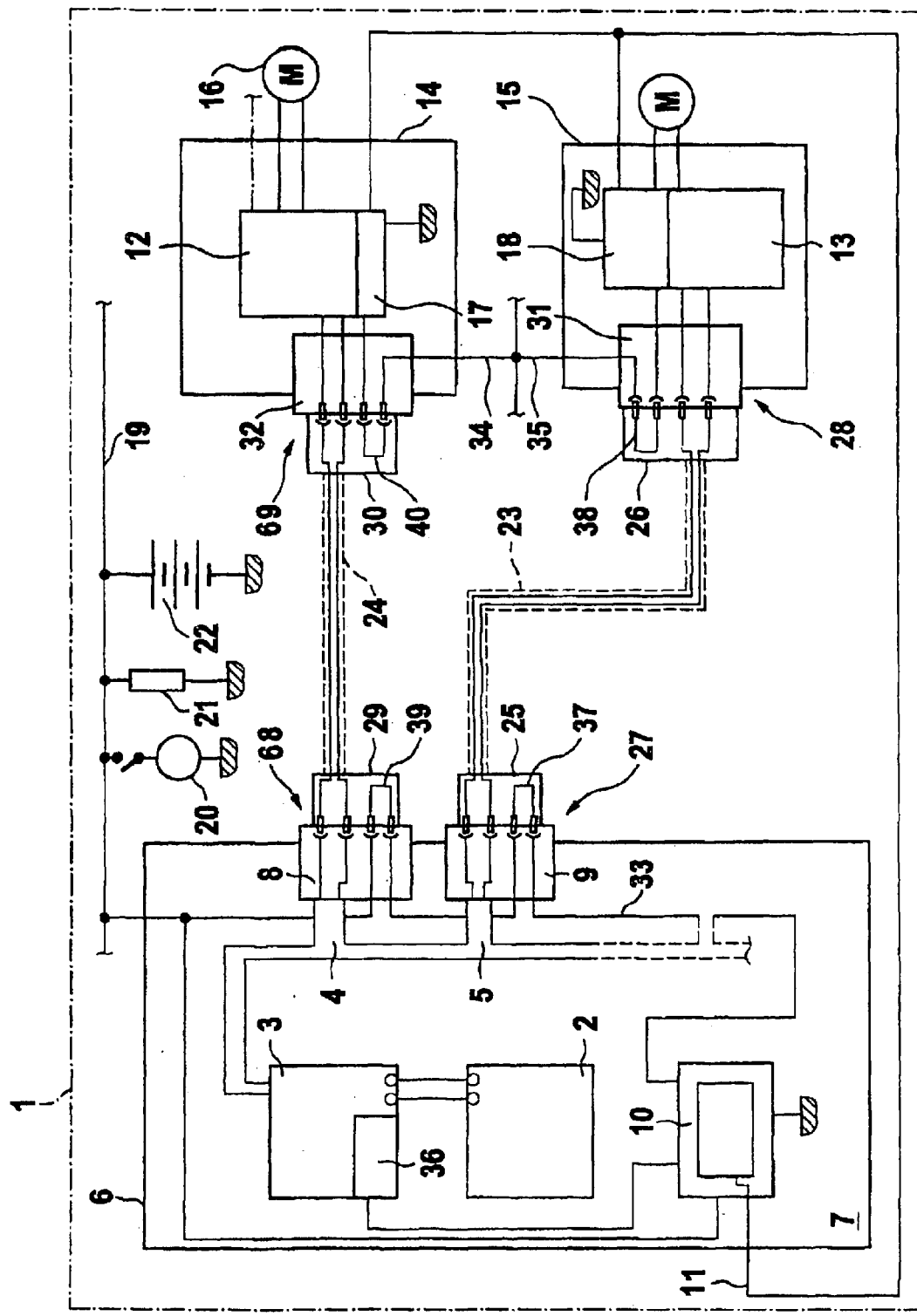
FIG. 1 shows a block diagram of a representative electrical energy distribution network in a mobile device comprising an energy generating device and electrical loads, which are connected by lines with plug-in connectors at their ends to a central switching and distribution unit.

The problem to be solved by the invention is to specify a mobile device comprising an apparatus for the generation of electrical energy and electrical loads that are arranged in an energy distribution network, which is connected to the energy generating device and in which branch lines are equipped with plug-in connectors that can be disconnected manually and are only disconnected when in a de-energized state.

The invention provides a solution to this problem in a mobile device of the above-mentioned type by means of the following features: (i) the electrical loads can be connected and disconnected by hand—using flexible lines that are equipped with plug-in connector elements at their ends—to the plug-in connector elements of a switching and distribution unit; (ii) the plug-in connector elements arranged at the load side of the flexible lines can be connected and disconnected manually to/from the plug-in connector elements of the loads; (iii) each of the plug-in connector elements attached to the flexible lines contains a device with contact means for opening and closing of a line section of a control circuit, whereby these contact means are opened prior to and closed after the contacts that are arranged in the plug-in connector elements of the branches of the energy distribution network; and (iv) opening the contact means of one or several devices opens one switching means that is arranged before the branches in the switching and distribution unit and/or switching means arranged in the individual branches, and when the contact means of the device are closed, the one and/or the several switching means are enabled to be closed.

Contact means that 'open prior to' or 'close after' contacts are contact means that will only be closed after other contact means have established a connection and will be opened before these other contact means are disconnected. The switching means are, in particular, switch disconnectors or power circuit-breakers, which in their open state isolate the branches against the terminals of the energy generating device.

In the mobile device according to the invention, the plug-in connectors are pulled apart in a de-energized state. Detaching the plug-in connector elements at the switching and distribution unit results in a de-energized state of the contacts of the plug-in connector elements arranged on the supply side of the energy distribution network, since the switching means in the branches will be opened. The load-side ends of the contacts of the plug-in connectors of the energy distribution network will be de-energized. If the plug-in connectors at the load-side ends of the flexible lines are separated by hand, then the branches are disconnected before the contacts of the energy distribution network, which is at a high voltage, are opened. Plug-in connector elements are components that can be combined with other plug-in connector elements to form plug-in connectors and connect electrical lines.

Since the disconnecting of the plug-in connector elements takes place when the contacts of the energy distribution network, at the high voltage, are de-energized, no electric arcs can occur that could damage the contacts. Also prevented is any endangerment of persons who separate the plug-in connector elements. Consequently, it is not necessary for the plug-in connector elements to be of a strength to be able to withstand the electric arcs associated with a high contact interrupting rating.

It is practical if the plug-in connector elements at the flexible lines that may be connected on or in the switching and distribution unit are equipped with blade contacts, while the contacts of the energy distribution network arranged on or in the switching and distribution network are executed as spring-mounted contacts or socket contacts and the plug-in connector elements arranged at the load-side ends of the flexible lines are equipped with socket contacts, which engage with the blade contacts of the plug-in connector elements of the loads. This embodiment may be designed so that switching means in the loads de-energize the plug-in connector contacts during the disconnecting of the load-side plug-in connector elements without switching off the switching means of the switching and distribution unit. Given a normal handling of the flexible lines, an endangerment of personnel is ruled out by the design of the load-side plug-in connector elements at the flexible lines as spring-loaded or socket contacts.

Opening the device with the contact means or separating the plug-in connector elements of a plug-in connector on the load side of the flexible lines causes the load to be stopped, i.e., to be put into a harmless state.

The devices for opening and closing lines sections preferably are contact bridges or cable links in the plug-in connector elements connected to the flexible lines and are connected to connector contacts, which may be connected to connector contacts in plug-in connector elements of the switching and distribution unit or of the loads. This embodiment is characterized by an especially simple design.

In another favourable embodiment, the devices for closing and opening of line sections are switching devices, which are arranged in one of the two corresponding plug-in connector elements, will be put into a closed state by the other plug-in connector element when the plug-in connector elements are connected, and will be open if the other plug-in connector element is absent. The switching devices preferably are micro-switches. One advantage of this embodiment is that there is no need for the plug-in connector elements at the flexible lines to contain contacts and lines for control circuits. Projecting elements for actuating the switch contacts are sufficient.

It is practical for the loads to be equipped with control units to detect the control state of the contact means of the respective device for opening and closing of the line section, whereby the control units are connected via a bus to a control unit, which is situated in the switching and distribution unit and is designed to control the one or several switching means. Signals that indicate the connecting of the plug-in connectors are transmitted via the bus to the control unit in the switching and distribution unit, so that the control unit can set the switching means accordingly.

A circuit, which is only closed if all of the plug-in connector elements at all plug-in connectors of the energy distribution network are connected, is connected to the control unit in the switching and distribution unit. Consequently, the control unit in this embodiment will immediately detect if one of the plug-in connector is disconnected, which enables a very rapid reaction to any changes of the state of the plug-in connectors.

Preferably there exists a source for an auxiliary supply voltage or control voltage, which is connected to the operating coil of the one switching means or the operating coils of the several switching means after being enabled by the control unit in the switching and distribution unit when the contact means of the devices in the plug-in connectors for opening and closing of line sections are closed. In particular, this auxiliary supply voltage or control voltage is the operating voltage of an electrical network, which possesses a lower nominal voltage than the energy distribution network with a voltage of, for example, the magnitude of a heavy-current low-voltage network and contains a storage battery in addition to electrical loads. The operating voltage of this additional energy distribution network preferably is between 12 and 14 V. For this reason, this further network hereafter will be referred to as the low-voltage network.

It is favourable for the control units in the loads of the energy distribution network to contain processors, each of which is connected with one input to a tap of the respective device for opening and closing of a line section and the control voltage or auxiliary supply voltage is applied to the input when the contact means of the device are closed, whereby the processors are connected via the bus to the switching and control unit in the switching and distribution unit, and whereby one input of the control unit in the switching and distribution unit is connected to the tap of the series-connected contact means of the device for opening and closing of the line sections of the control circuit—which is supplied by the control voltage or auxiliary supply voltage—in the switching and distribution unit, and whereby the one and/or several switching means is/are enabled to be closed when the auxiliary supply voltage or control voltage is applied to the inputs of the processors and of the control unit. This layout does not require a separate control line for the control voltage between the loads and the switching and distribution unit. The already present bus is used to signal the opening and closing of the contact means for the auxiliary supply voltage at the plug-in connectors.

In an especially practical embodiment, the plug-in connectors are equipped with a double locking device, whereby a first locking mechanism engages in the plug-in connectors after the contacts of the branches of the energy distribution network have closed and a second locking mechanism engages after the closing of the contact means of the device for opening and closing the line section of the control circuit, whereby the two locking mechanisms are coupled in a manner so that the first locking mechanism can only be unlocked after the second locking mechanism, which can be unlocked manually, has been unlocked and the contact means have been manually disconnected.

Removing the plug-in connector requires two steps: the first—in particular mechanical—connector interlock is released. Pulling apart the connector all the way to the second—in particular mechanical—connector interlock disconnects the bridge in the control voltage line, and as a result of this a switch-disconnector de-energizes all high-voltage plug-in connections.

The first connector interlock exposes the second interlock (ensures that the connector can not be pulled without safety shutdown). Only now is it possible to completely separate the respective plug-in connector. This time sequence is ensured by the mechanical two-stage-connector solution.

Preferably, the mobile device is a motor vehicle.

In the following, the invention will be described in more detail with the help of embodiments shown in the Figures, which will illustrate further details, features, and advantages.

A mobile device 1, in particular a motor vehicle, contains an electrical energy generating device 2, preferably a fuel cell, which may, for example, be a PEM fuel cell. A power circuit-breaker or switch-disconnector 3 is connected to the outputs or terminals (not labelled) of the energy generating device 2, which, during operation, outputs a direct voltage of, for example, 200 V or higher, for example 450 V. For this reason, the energy distribution network is referred to as high-voltage network.

On its output side, the circuit-breaker or switch-disconnector 3 is connected to branches 4, 5 and further branches (not shown) of a high-voltage radial network. The circuit-breaker or switch-disconnector 3 is located in the housing 6 of a switching and distribution unit 7.

Inside the housing 6, the branches are arranged as strip conductors, e.g., on a printed circuit board, or as conductor bars, and extend to the plug-in connector elements 8, 9, which are arranged in or on the wall of the housing 6 and are rated for the voltage of the energy generating device 2, the voltage of which is higher than the voltage that has up to now been used for electrical loads in motor vehicles and is of the same magnitude as the low voltage of a heavy-current network. On account of the nominal voltage of up to 450V, the network connected to the circuit-breaker or switch-disconnector 3 hereafter is also referred to as high-voltage network.

The energy generating device 2 is located inside the housing 6 of the switching and distribution unit 7 or is connected to this housing 6. Also located inside the housing 6 is a sensor monitoring and control unit 10, which is connected to sensors (not shown) to detect the operating states of the energy generating device 2 and of the high-voltage network and contains at least one processor, which is connected via a CAN bus 11 to sensor and control units 12, 13, of a traction drive unit 14, of a compressor unit 15, and further auxiliaries (not shown) for the energy generating device 2. The traction drive 14 consists for example of a unit that comprises a power converter and a drive motor 16. The traction drive 14 is controlled by a processor 17 of the control unit 12. The compressor unit 15 contains the control unit 13 with a processor 18 and a power converter (not shown) that supplies the compressor, which is provided to supply the energy generating device—which in this case is a fuel cell—with air. An accessory drive unit (not shown) contains for example fan motors and a pump motor for coolant.

In addition to the high-voltage network, the mobile device 1 contains a further network 19, which possesses a lower voltage of in particular 12 to 14 V. This low-voltage network 19 contains electrical loads such as windshield-wiper motors 20, heater circuits 21, and power-window motors, light fixtures, lamps, etc. (not shown), as well as a storage battery 22. The low-voltage network 19 is connected to the high-voltage network via a dc-dc converter (not shown), which can transmit energy in both directions. The storage battery 22 is charged during the transfer of energy from the high-voltage network to the low-voltage network 19.

The energy in the high-voltage network is transferred via flexible lines, such as a cable 23 to the compressor unit 15, a cable 24 to the traction drive unit 14, and cables (not shown) to the auxiliaries. In a corresponding manner, energy is supplied to the dc-dc converter via a branch (not shown) that contains a cable. The cables 23 and 24 are components of the respective branches 5 and 4 and consist of two or more flexible electrical wires. The ends of the cable 23 are equipped with plug-in connector elements 25, 26 of plug in connectors 27, 28. In a corresponding manner, the ends of the cable 24 are equipped with plug-in connector elements 29, 30 of plug-in connectors 68, 69, and the ends of the not-shown cables are equipped with plug-in connector elements of not-shown plug-in connectors.

The plug-in connector elements 9 and 25 can be combined to form the plug-in connector 27. In a corresponding manner, the plug-in connector elements 8 and 29 can be combined to form the plug-in connector 68. The plug-in connectors may be coded to prevent mistakes during assembly. The plug-in connector elements 26 and 30 correspond to the plug-in connector elements 31, 32, which are located at the compressor unit 15 and the traction drive unit 14, respectively.

As explained by the above comments, each plug-in connector consists of two parts or elements, one of which is equipped with blade elements, which can be inserted into the spring-mounted elements of the other part. For example, the plug-in connector elements 8 and 9 are equipped with spring elements, while the plug-in connector elements 29 and 25 possess blade elements. The plug-in connector elements 26 and 30 are equipped with spring elements and the plug-in connector elements 31 and 32 possess blade elements.

The invention guarantees that during the separation of the plug-in connector elements 25, 29, 26, 30, i.e., when the plug-in connectors 27, 68, 28, 69 are separated by hand, no voltage will be present at the contacts of the energy distribution unit. Consequently, the plug-in connectors cannot be separated under load, which ensures safety when working at the high-voltage components.

The plug-in connector elements 25, 26, 29, and 30, that are attached to the flexible lines, contain devices with contact means to open and close line sections of a control circuit 33, 34 or 35. The control circuits 33, 34, and 35 are supplied with an auxiliary supply voltage or control voltage that is significantly lower than the voltage of the high-voltage network. In particular, this auxiliary supply voltage is the voltage of 12–14 V of the low-voltage network 19.

The control circuits 33, 34, and 35 are connected to the sensor and control unit 10 and the control units 12 and 13, respectively. In particular, the control circuits 33, 34, 35 are connected to inputs of the processor in the sensor monitoring and control unit 10 and the processors 17 and 18. Depending on whether the control circuits are open or closed, i.e., depending on whether the processor in the control unit 10 and the processors 17 and 18 detect the control voltage or auxiliary supply voltage of 12–14 V at one of their inputs, the control units 10, 12, 13 influence the control state of the switch-disconnector or power circuit-breaker 3. It is also possible to use a different signal, e.g., a pulse-width modulated signal or a current signal—instead of the control voltage or auxiliary supply voltage of 12–14 V—to monitor the open or closed state of the control circuits. For at least one open control circuit 33, 34, 35, the switch-disconnector or power circuit breaker 3 is open. When the control circuits 33, 34, 35 are closed, the switch-disconnector or power circuit-breaker 3 is enabled to be closed, and will be closed when, for example, the control unit 10 has issued an appropriate command. Such a command is dependent on the conditions in the mobile device 1.

When the plug-in connector elements 9 and 25, 8 and 29, 26 and 31, or 30 and 32 are mated, the devices to close and open the line sections of the control circuits 33, 34, and 35 by means of the plug-in connectors 27, 68, 28, and 69 will ensure that the contacts of the plug-in connector elements 9 and 25, 8 and 29, 26 and 31, 30 and 32 will be connected before the contacts of the contact means will be connected that close the line sections of the control circuits 33, 34, 35. Consequently, the control units 10, 12, and 13 will only detect the auxiliary supply voltage or control voltage after the contacts of the high-voltage circuits have been closed in the plug-in connectors 27, 68, 28, 69, and will then—in the event that all circuits have been closed—enable the closing of the switch-disconnector or power circuit breaker 3. The control units 12, 13 will signal the presence or absence of the auxiliary supply voltage or control voltage at their inputs that are associated with the respective control circuits 34, 35 to the control unit 10. Subsequently, this control unit 10—in dependence on the auxiliary supply voltage or control voltage at the sensing inputs of the control units 12, 13 and at its input that is connected to the control circuit 33—will enable the switch-disconnector or power circuit breaker 3 to be closed.

When the plug-in connector elements 9, 25; 8, 29; 26, 31, 30, 32 are separated manually by pulling the plug-in connector elements 25, 29, 26, and 30 from the plug-in connector elements 9, 8, 31, and 32 that are permanently attached at or in housings, the line sections of the control circuits 33, 34, 35 will be opened before the contacts arranged in the high-voltage network will be separated. After the line sections in the control circuits 33, 34, 35 have been disconnected, the control units 10, 12, 13 will detect the absence of the auxiliary supply voltage or control voltage at their sensing inputs, which causes the switch-disconnector or power circuit breaker 3 to be opened. Subsequently, the separation of the contacts in the high-voltage network of the plug-in connectors 27, 68, 28, 69 takes place in a de-energized state.

One output (not labelled) of the control unit 10 is connected to a switch (not shown), which is located in the circuit of the operating coil 36 of the switch-disconnector or power circuit breaker 3. Connecting the operating coil to the auxiliary supply voltage or control voltage of the low-voltage network 19 by closing the switch results in the closing of the switch-disconnector or power circuit breaker 3. When the operating coil 36 is de-energized, the switch-disconnector or power circuit breaker 3 is open, i.e., de-energized.

The devices—for closing and opening of the line sections of the control circuits 33, 34, 35—in the plug-in connector elements 25, 26, 29, and 30 are cable links or contact bridges, which together with respective contact pairs (not labelled) in the plug-in connector elements 9, 31, 8, and 32 create a line link in the circuits 33, 34, and 35 to connect to the 12 or 14 V network 19.

The devices for closing and opening the line sections 33, 34, 35 may also be switches, in particular micro-switches, which will be actuated to close after the contacts of the high-voltage side of the plug-in connectors 27, 68, 28, 69, and will be opened before the opening of the contacts of the high-voltage side.

Figure 2:
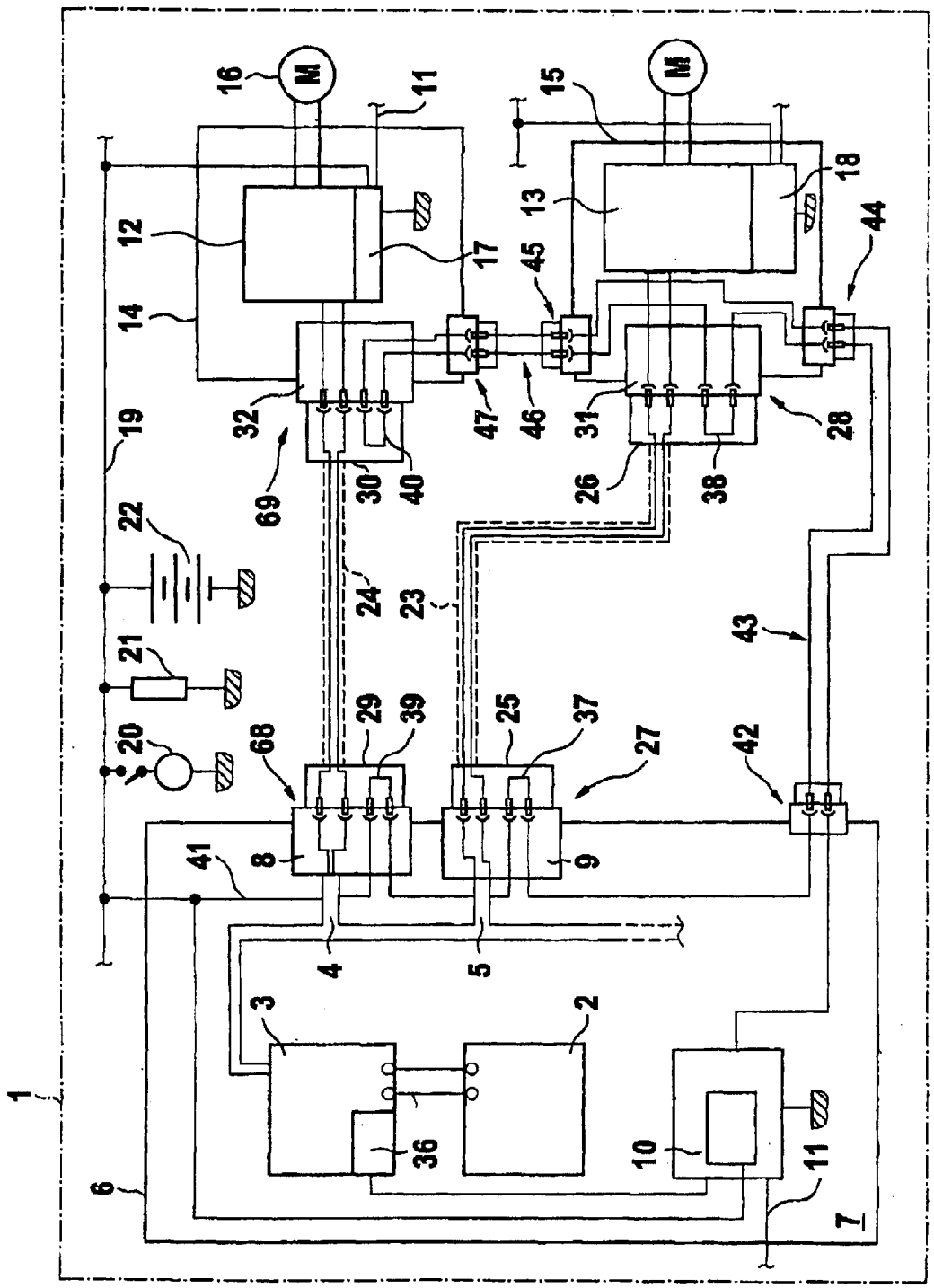
FIG. 2 shows a block diagram of an additional representative electrical energy distribution network in a mobile device comprising an energy generating device and electrical loads, which are connected by lines with plug-in connectors at their ends to a central switching and distribution unit, which in turn is connected to the loads via further control lines.

In the embodiment of a mobile device shown in FIG. 2, the components that correspond to components of the device 1 shown in FIG. 1 carry the same reference labels. One difference between the embodiment shown in FIG. 2 and the device according to FIG. 1 is that in place of the control circuits 33, 34, 35 only one control circuit 41 is provided, which extends between all of the loads of the high-voltage network, e.g., the traction drive unit 14, the compressor unit 15, and the switching and distribution unit 7.

The control circuit 41 is supplied in the switching and distribution unit 7 with control voltage by the 12–14 V network and extends through the series-arranged contact bridges 39, 37—if the plug-in connector elements 8, 29 and 9, 25 are connected—to a plug-in connector 42, one element of which (not labelled) is arranged in or at the housing 6, and the other element of which (not labelled) is connected to a twin-wire cable 43. On its other end, the cable 43 is connected to one element (not labelled) of a plug-in connector 44, the other element of which is arranged in the housing of the compressor unit 15. In the compressor unit 15, a line extends from the plug-in connector 44 to the plug-in connector element 31, which—when connected with the plug-in connector element 26—causes a line section of the control circuit 41 to be closed all the way to one element (not shown) of a plug-in connector 45, from where a second line runs in the compressor unit 15 to the plug-in connector 44. The plug-in connector 45 is connected via a twin-wire line 46 to one element (not labelled) of a plug-in connector 47, the other element of which is arranged in the housing of the traction drive unit 14 and is connected via a twin-wire line to the plug-in connector element 32, whereby the twin-wire line may be bridged by the contact bridge 40 of the plug-in connector element 30.

Through the cables 43 and 46, the control circuit extends back to the plug-in connector 42, from where a line is connected to the input of the control unit 10 to detect the control voltage.

Pulling one of the plug-in connector elements 25, 26, 29, 30 by hand causes the control circuit 41 to be interrupted, so that the control unit 10 will no longer detect the control voltage and immediately will initiate the opening or de-energizing of the switch-disconnector or power circuit breaker 3. After the plug-in connectors 27, 28, 68, 69 are plugged in, the control voltage will not be applied to the sensing input of the control unit 10 until all of the plug-in connectors have been connected. Due to the fact that during the combining of the plug-in connectors, the plug-in connector contacts associated with the contact bridges 37 to 40 will be connected after, and that during the separating of the plug-in connectors the contacts will be separated earlier than the contacts of the high-voltage side, the contacts of the high-voltage side will be in a de-energized state during the connecting and disconnecting, which rules out any danger to the personnel handling the plug-in connectors.

Figure 3:
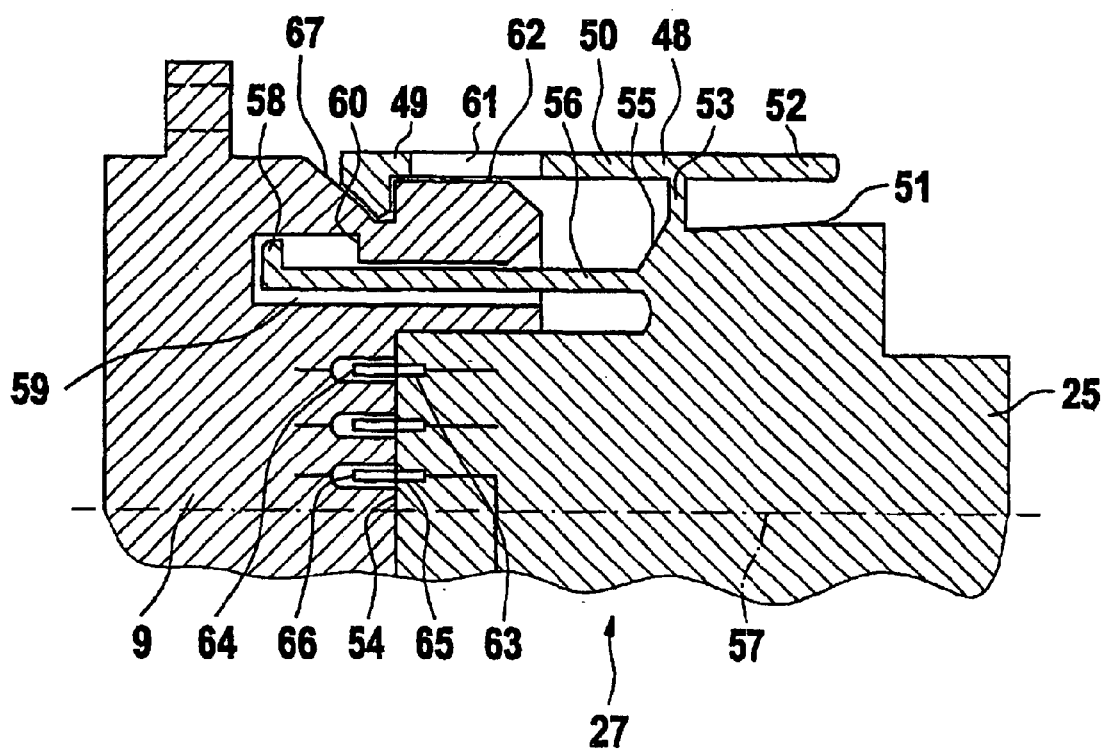
FIG. 3 shows a longitudinal section—partially schematic—of a plug-in connector with a first and second mechanical locking mechanism.

FIG. 3 shows in a longitudinal section—partially schematic—one element of a plug-in connector, e.g., the plug-in connector 27 with the plug-in connector elements 9 and 25. The other half is executed symmetrically with respect to the shown half. The plug-in connector 68 has the same design, but may differ with respect to the gauge of the contacts on the high-voltage side on account of a different current intensity. The plug-in connectors 28, 69 possess an identical locking mechanism.

The plug-in connector element 25 is equipped with a pair of latching elements 48, each of which comprises one lever arm 50 equipped with a detent 49 and one lever arm 52 intended to be manually pressed against the housing surface 51. The lever arms 50, 52 are connected to the housing surface 51 via a resilient segment 53.

A resilient arm 56 of the plug-in connector element 25 projects from a shoulder 55 that is recessed into the front side 54. At its tip, the arm 56 is equipped with a detent 58, which—if the plug-in connector elements 9, 25 are connected—projects into an opening 59 of the plug-in connector element 9 and extends in parallel to the centre line 57 of the plug-in connector 27. The opening 59 has a stop face 60. The lever arm 50 possesses a through-opening 61, which is situated above the housing surface 62 of the plug-in connector element 9 when the plug-in connector elements 9, 25 are in the connected state.

The plug-in connector element 25 is equipped with blade contacts 63—only one of which is labelled in FIG. 3—which engage into sockets or spring contacts when the plug-in connector elements 9, 25 are in the connected state. These are heavy-duty contacts. Two additional blade contacts, of which only one contact 65 of the plug-in connector element 25 is illustrated, engage into socket contacts 66 of the plug-in connector element 9. The contacts 65, 66 are associated with the control circuit 33, 41, respectively, and consequently close after the contacts 63, 64 when the plug-in connector elements are being combined and open prior to the contacts 63, 64 when the plug-in connector elements are being separated.

During the combining of the plug-in connector elements 9, 25, the detent 58 at first snaps into place at the stop face 60, while the contacts 63, 64 are being connected and the detent 49 glides along the housing surface 62. Pushing the elements further together results in the detent 58 moving inside the cavity until the detent 49 snaps into place in a notch 67 of the housing surface 62, whereby the contacts 65, 66 are connected to each other. At the time when the detent 58 snaps into place at the stop face 60, the contacts 65, 66 are still open. The contacts 65, 66 only close once the plug-in connector element 25 has been pushed a bit further into the plug-in connector element 9.

To separate the element, the lever arm 52 is pressed down, which causes the detent 49 to leave the notch 47. Now, the plug-in connector element 25 may be moved away from the plug-in connector element 9 in the axial direction, whereby the contacts 65, 66 are separated. The axial movement is stopped when the detent 58 comes in contact with the stop face 60. At this time, the contacts 63, 64 are still closed. In this position, the opening 61 allows access to the arm 56, which is then—through the opening 61—pushed down beyond the stop face 60, to be able to continue the axial movement to separate the plug-in connector elements 9, 25 and the contacts 63, 64.

Thus, the invention provides the following procedures at the switching and distribution unit 7 to insure a safety-disconnect when the plug-in connectors are or have been separated:

1. The high-voltage plug-in connectors at the control and switching unit are equipped with additional jumpers.
2. The control line (e.g., class 30b) is looped in series through all high-voltage connectors, all the way to the control input of the control unit 10 to open the switch-disconnector 3.
3. Two steps are necessary to separate the plug-in connector elements:

Release the first (mechanical) connector interlock. Pulling the plug-in connector element to the second (mechanical) connector interlock causes the jumper, which conducts the 12 V or another control voltage of the above-described type, to be interrupted and, as a result, the one or several switch-disconnector(s) de-energize(s) all high-voltage plug-in connections.

The first connector interlock allows access to the second interlock (ensures that the plug-in connectors can not be separated without a safety shutdown).

Only now is it possible to completely separate the plug-in connector.

The time sequence can be enforced by a two-stage mechanical connector design.

Furthermore, the invention provides for the following procedures at the loads to ensure load interruption:

1. The high-voltage connectors at the loads are equipped with additional jumpers.
2. Additionally, the voltage supply for the control electronics of the high-voltage loads is looped through these jumpers of the high-voltage connectors.
3. Two steps are required to separate the plug-in connector elements:

Release the first (mechanical) connector interlock. Pulling the connector element all the way to the second (mechanical) connector interlock causes the control voltage supply to be interrupted, as a result of which the control electronics detect a fault (open circuit, etc.) and cause the load to enter a safe state. It is state of the art in control technology to bring the load or the movement to a safe state in the event that a fault/malfunction is detected.

The first connector interlock allows access to the second interlock (ensures that the plug-in connectors can not be separated without a safety shutdown).

Only now is it possible to completely separate the plug-in connectors.

This time sequence can be enforced by a two-stage mechanical connector design.

4. A failure of the internal voltage supply of the loads results in the failure of the CAN bus 11. Consequently, the failure of a load and its CAN can also be used as a redundant de-energizing of the switch-disconnector, by means of the CAN.

Other interrupting devices may be installed instead of jumpers, e.g. micro-switches, etc., whereby one can use a configuration with or without connector interlocks. A mechanical connector interlock is especially favourable to ensure that the connector can not be separated without a safety shutdown.

What is claimed is:

1. A mobile device comprising:

(a) an energy generating system;

(b) an electrical load; and (c) an energy distribution network comprising a branch coupling the energy generating system and the electrical load, wherein, the energy distribution network further comprises:

(i) a switching means;

(ii) a switching plug-in connector element coupled to the switching means;

(iii) a load plug-in connector element coupled to the electrical load; and (iv) a flexible line comprising a first plug-in connector element, adapted to engage the switching plug-in connector element, and a second plug-in connector element, adapted to engage the load plug-in connector element, wherein, each of the plug-in connector elements have a branch contact for forming an electrical connection between the energy generating system and the electrical load, and each of the first and second plug-in connector elements have a device with a contact means for opening and closing a line section of a control circuit of the energy distribution network, and wherein, when the first and second plug-in connector elements are joined to, or separated from, the switching plug-in connector element and the load plug-in connector element, respectively, the contact means close later, or open earlier, than the branch contacts, and wherein, when the contact means are closed, the switching means is closed, and when the contact means are open, the switching means is open.

2. The mobile device of claim 1, wherein the switching means is a switch-disconnector or a power circuit-breaker.

3. The mobile device of claim wherein separating the plug-in connector elements under a load brings the mobile device to a standstill.

4. The mobile device of claim 1, wherein the device with a contact means is a contact bridge or cable link with connector contacts which may be coupled to connector contacts in the switching plug-in connector element and the load plug-in connector element.

5. The mobile device of claim 1, wherein the device with a contact means is a switching device which is closed when the plug-in connector elements are joined and open when the plug-in connector elements are separated.

6. The mobile device of claim 1, wherein the energy distribution network further comprises:

a first control unit, adapted to monitor the contact means of the second plug-in connector element; and a second control unit, adapted to control the switching means, wherein the first and second control units are connected via a bus.

7. The mobile device of claim 6, wherein the control circuit is coupled to the second control unit and is closed when the plug-in connector elements are joined.

8. The mobile device of claim 6, wherein the energy distribution network further comprises an auxiliary voltage source which is coupled to an operating coil of the switching means by the second control unit when the contact means are closed.

9. The mobile device of claim 8, wherein the energy generating system comprises a fuel cell having an output voltage of the same magnitude as the low-voltage of a heavy-current network.

10. The mobile device of claim 9, wherein the auxiliary voltage source has the operating voltage of an electrical network having a lower nominal voltage than the energy distribution network and comprises a storage battery.

11. The mobile device of claim 8, wherein:

the first control unit comprises a first processor, which has a first input coupled to a tap of the device of the second plug-in connector element and to the auxiliary voltage source when the contact means are closed;

the first processor is connected to the second control unit via the bus; and the second control unit comprises a second processor, which has a second input coupled to a tap of the device of the first plug-in connector element and to the auxiliary voltage source when the contact means are closed.

12. The mobile device of claim 1, wherein the plug-in connector elements are joined by a double mechanical interlock comprising:

a first locking mechanism, which engages after the branch contacts have joined; and a second locking mechanism, which engages after the contact means have closed, wherein the first locking mechanism may only be disengaged after the second locking mechanism has been disengaged.

13. The mobile device of claim 1, wherein the mobile device is a motor vehicle.

* * * * *